United States Patent

Piejko et al.

Patent Number: 5,252,674
Date of Patent: * Oct. 12, 1993

[54] THERMOPLASTIC GRAFT POLYMERS CONTAINING OXETANYL GROUPS

[75] Inventors: Karl-Erwin Piejko, Bergisch Gladbach; Christian Lindner, Cologne; Gerd Fengler, Krefeld; Hans-Eberhard Braese; Jürgen Kirsch, both of Cologne, all of Fed. Rep. of Germany

[73] Assignee: Bayer Aktiengesellschaft, Leverkusen-Bayerwerk, Fed. Rep. of Germany

[*] Notice: The portion of the term of this patent subsequent to Oct. 13, 2009 has been disclaimed.

[21] Appl. No.: 459,982

[22] Filed: Jan. 2, 1990

[30] Foreign Application Priority Data

Jan. 14, 1989 [DE] Fed. Rep. of Germany ....... 3901031

[51] Int. Cl.$^5$ ................ C08F 224/00; C08F 265/04; C08F 279/02; C08L 51/04
[52] U.S. Cl. .................... 525/284; 524/494; 524/531; 524/504; 525/64; 525/71
[58] Field of Search .............. 525/284, 64, 71; 524/494, 531, 504

[56] References Cited

U.S. PATENT DOCUMENTS

| | | | |
|---|---|---|---|
| 4,707,512 | 11/1987 | Maruyama et al. | 525/284 |
| 4,772,496 | 9/1988 | Maeda et al. | 428/35.9 |
| 4,806,613 | 2/1989 | Wardle | 528/59 |
| 5,155,168 | 10/1992 | Lütjens et al. | 525/284 |

OTHER PUBLICATIONS

"Hawley's Condensed Chemical Dictionary", Eleventh Edition, N.Y., Van Nostrand Reinhold Company, 1987, p. 933.
Chemical Abstracts, 81:153514t, vol. 81, 1974.
Chemical Abstracts, 70:68852e, vol. 70, 1969.

*Primary Examiner*—Vasu S. Jagannathan
*Attorney, Agent, or Firm*—Connolly & Hutz

[57] ABSTRACT

Graft polymers having graft shells of copolymers of styrenes, α-methyl styrenes, acrylonitrile, $C_1$–$C_4$ vinyl carboxylic acids, $C_1$–$C_8$ alkyl acrylates and/or alkyl methacrylates, maleic acid derivatives, vinyl(idene) chloride and mixtures thereof on the one hand and monomers corresponding to formula I

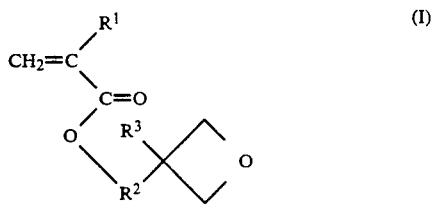

in which
$R^1$ = H, $CH_3$,
$R^2$ = $C_1$–$C_8$ alkylene,
$R^3$ = $C_1$–$C_4$ alkyl
on the other hand and
graft bases of particulate diene and/or acrylate rubbers having particle diameters ($d_{50}$) of from 80 to 800 nm, and thermoplastic molding compounds containing these graft polymers.

5 Claims, No Drawings

THERMOPLASTIC GRAFT POLYMERS CONTAINING OXETANYL GROUPS

This invention relates to thermoplastic graft polymers containing oxetanyl groups and to thermoplastic molding compounds produced therefrom.

Thermoplastic molding compounds containing resin-like polymers, for example styrene/acrylonitrile copolymers or methyl methacrylate polymers and graft polymers (for example ABS, MBS or ASA), are widely used for the production of moldings, such as housings of electrical appliances, profiles and pipes, by injection molding or extrusion. Molding compounds such as these can be damaged by the high processing temperatures prevailing during production of the moldings. This is reflected, for example, in discoloration and cannot be prevented, even by stabilizers. In certain applications of the moldings, for example as housings of domestic appliances, discoloration can also be caused by local overheating. Accordingly, there is a need for materials which show high thermal stability and which enable moldings having improved mechanical properties, particularly after prolonged use, to be produced.

The present invention relates to graft copolymers containing

A1 Graft shells of copolymers of

A1.1 Styrenes, α-methyl styrenes, acrylonitrile, $C_1$–$C_4$ vinyl carboxylic acids, $C_1$–$C_8$ alkyl acrylates and/or $C_1$–$C_8$ alkyl methacrylates, maleic acid derivatives, vinyl(idene) chloride and mixtures thereof on the one hand and A1.2 Monomers corresponding to formula I

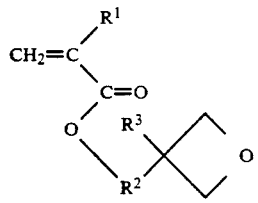

in which
$R^1$ = H, $CH_3$,
$R^2$ = $C_1$–$C_8$ alkylene,
$R^3$ = $C_1$–$C_4$ alkyl
on the other hand and A.2 Graft bases of particulate diene and/or acrylate rubbers having particle diameters ($d_{50}$) of from 80 to 800 nm and preferably from 100 to 600 nm.

The graft polymers according to the invention are preferably partly crosslinked and have gel contents of more than 35% by weight and more especially from 60 to 95% by weight. They preferably contain from 10 to 95% by weight and, more preferably, from 20 to 90% by weight of rubber ($A_2$).

(For measurement of the particle diameter, see W. Scholtan and H. Lange, Kolloid-Zeitschrift und Zeitschrift für Polymere, 250 (1972), pages 787–796. The gel contents are determined in accordance with M. Hoffmann et. al., Polymeranalytik I und II, Georg Thieme-Verlag, Stuttgart (1977).)

Preferred graft shells A1 are produced from

A1.1 99 to 55% by weight, preferably 98 to 70% by weight and, more preferably, 97 to 80% by weight styrene, α-methyl styrene, p-methyl styrene, acrylonitrile, methyl-, n-butyl-, cyclohexyl methacrylate, n-butyl acrylate, vinyl acetate and A1.2 45 to 1% by weight, preferably from 30 to 2% by weight and, more preferably, from 20 to 3% by weight monomers corresponding to formula I in which
$R_1$ = H, $CH_3$,
$R_2$ = methylene,
$R_3$ = $C_1$–$C_2$ alkyl.

The monomers A1.1 and A1.2 used for the production of the graft shells A1 are known.

The particulate graft base (rubber base) A2 is preferably a generally partially crosslinked diene or alkyl acrylate rubber prepared by radical emulsion polymerization and having mean particle diameters ($d_{50}$) of from 80 to 600 nm and preferably from 100 to 600 nm.

Diene rubbers are, for example, polybutadiene, polyisoprene and copolymers of butadiene with up to 35% by weight comonomers, such as styrene, acrylonitrile, methyl methacrylate, $C_1$–$C_6$ alkyl acrylate. Acrylate rubbers are, for example, crosslinked particulate emulsion polymers of $C_1$–$C_6$ alkyl acrylates, more especially $C_2$–$C_6$ alkyl acrylates, optionally in admixture with up to 15% by weight comonomers, such as styrene, methyl methacrylate, butadiene, vinyl methyl ether, acrylonitrile and at least one polyfunctional crosslinking comonomer, for example divinyl benzene, glycol bisacrylates, bisacrylamides, phosphoric acid triallyl ester, allyl esters of (meth)acrylic acid, triallyl (iso)cyanurate; the acrylate rubbers may contain up to 4% by weight of the crosslinking comonomers.

These rubbers are known. The multiphase acrylate rubbers described in DE-OS 3 200 070, which consist of a highly crosslinked core of diene rubber and a shell of crosslinked acrylate rubber (core/shell rubber), may also be used with advantage. The multiphase acrylate rubbers contain in particular from 0.5 to 10% by weight and preferably from 2 to 4% by weight diene rubber (as core).

The rubbers A2 have gel contents (as a measure of the crosslinking) of greater than 35% by weight and preferably from 60 to 95% by weight.

The graft polymers according to the invention may be prepared in known manner by aqueous emulsion polymerization with radical-forming initiators at temperatures in the range from 50° to 90° C. Suitable initiators are, for example, persulfate, perphosphate, hydroperoxides or azo compounds. Inorganic, water-soluble initiators are preferred. Anionic emulsifiers of the carboxylic acid salt type, for example salts of oleic acid, stearic acid, resinic acids, abietic acid and disproportionated derivatives thereof, are advantageously used in the graft polymerization.

The polymerization process applied must ensure that the oxetanyl groups remain intact (for example highly acidic medium (pH below 1) and highly alkaline medium (pH above 12) in combination with relatively high temperatures must be avoided during the emulsion polymerization). Copolymers containing oxetanyl groups, which have been produced in aqueous dispersion in mildly alkaline medium, are particularly suitable.

The present invention also relates to thermoplastic molding compounds based on the graft polymers according to the invention containing oxetanyl groups. The graft polymers according to the invention may be used individually as molding compounds, although it is preferred to use mixtures of 1) a graft polymer according to the invention containing oxetanyl groups and
2) a thermoplastic polymer or graft polymer. Component 2) may be a polymer of one or more monomers A1). Polystyrene, polymethyl methacrylate, polyvinyl chloride, styrene/acrylonitrile copolymers; α-methylstyrene/acrylonitrile copolymers and α-methylstyrene/acrylonitrile/methyl methacrylate copolymers are preferred. Component 2) may also be a graft polymer of vinyl monomers on a rubber base. Particularly suitable rubber bases are diene rubbers, alkylacrylate rubbers, olefin rubbers and silicone rubbers. The graft monomers polymerized in their presence are again preferably the vinyl monomers A1). Preferred graft polymers are at least partly crosslinked and have a particulate structure with mean particle diameters of from 100 to 3000 μm and preferably from 100 to 1000 μm. Thermoplastic rubbers, such as EPDM, ethylene-/vinyl acetate copolymers, acrylate rubber, diene/styrene block polymers and hydrogenation products thereof, are also suitable as component 2).

Preferred molding compositions are made from
1) an oxetanyl group containing graft polymer and
2) a thermoplastic resin like polymer.

Particularly preferred molding compounds according to the invention consist of a graft polymer according to the invention containing oxetanyl groups, polyvinyl chloride, an ABS or MBS graft polymer and, optionally, a thermoplastic styrene or α-methylstyrene copolymer.

The molding compounds may contain typical additives, such as lubricants and mold release agents, nucleating agents, stabilizers, fillers, reinforcing materials, flameproofing agents, dyes and heat stabilizers, antioxidants and/or light stabilizers. These additives are used in the usual quantities, generally in quantities of up to 30% by weight, but occasionally in quantities of up to 60% by weight (particularly in the case of fillers). The molding compounds may be obtained in the usual way by mixing of the components. Especially suitable are glass fibres as fillers. Molding compositions containing glass fibres have advantageous surface properties after moulding.

A specific embodiment of this invention are moulding compositions of
A) 2 to 70 parts by weight, preferably 5 to 60 parts by weight, of a graft polymer of
A1) 10 to 95 weight-% of a monomer mixture grafted to a rubber consisting of
A1.1) 99 to 50 weight-%, preferably 98 to 70 weight-% styrene, α-methyl styrene, acrylonitrile, $C_1-C_4$-vinyl carboxylic acid, $C_1-C_8$-alkyl acrylates, $C_1-C_8$ alkyl methacrylates, maleic acid derivatives, vinyl chloride, vinylidine chloride or mixtures thereof and
A1.2) 45 to 1 weight-%, preferably 30 to 2 weight-%, of a monomer of formula I onto
A2) 5 to 90 weight-% of a particulate diene and/or acrylate rubber having an average particle diameter $d_{50}$ of 80 to 800 nm, preferably 100 to 600 nm, and a gel content of more than 35% and
B) 30 to 98 parts by weight, preferably 40 to 95 parts by weight, of a thermoplastic copolymer of
B1) styrene, α-methylstyrene, acrylonitrile, methacrylonitrile, carboxylic acid, $C_1-C_4$-vinyl esters, acrylic acid esters, methacrylic acid esters, maleic acid derivatives, vinyl chloride, vinylidene chloride and optionally
B2) a monomer corresponding to formula I
C) 10 to 100 parts by weight (per 100 parts by weight of A+B) glass fibres.

The molding compounds are suitable for the production of moldings of all kinds. They generally show relatively high stability to ageing under the effect of environmental influences, chemicals, temperature stressing and melt flow shearing during processing and molding. This improved stability is also reflected in improved properties, such as color, a shorter processing cycle, long-term stability in use, a minimal content of impurities and secondary products, better gloss and better mechanical properties.

EXAMPLES

The polymers according to the invention containing oxetanyl groups are obtained by graft copolymerization of the monomer corresponding to formula Ia:

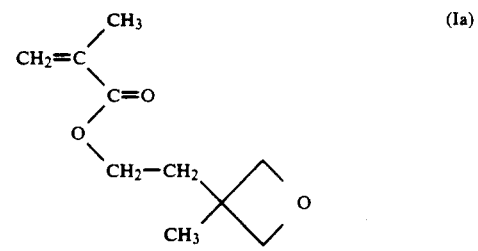

The quantities in the Examples are percentages by weight, unless otherwise indicated.

1. Constituents of the molding compounds according to the invention and the comparison molding compounds 1.1 Graft copolymers A

A-I:

3160 g water and 1640 g of a polybutadiene rubber latex having a solids content of 48.8% by weight and a mean particle diameter ($d_{50}$) of 390 nm are initially introduced into a reactor, followed by purging with nitrogen for 15 minutes. After heating to 65° C., a solution of 12 g potassium peroxodisulfate in 760 g water is added in a gentle stream of nitrogen. The following solutions are then uniformly fed into the reactor over a period of 7 hours:

Solution 1: 1120 g styrene, 634 g acrylonitrile, 112 g Ia.

Solution 2: 92 g of the sodium salt of disproportionated abietic acid, 69 g 1N sodium hydroxide, 506 g water.

The mixture is left to polymerize for 6 hours at 65° C., after which 1% by weight (based on solids) of a phenolic stabilizer is added and the latex is coagulated (pH 10) with an aqueous magnesium sulfate solution. The coagulate is washed with water and dried at 60° C.

A-II:

508 g water, 20 g 1N sodium hydroxide and 2317 g of an acrylate rubber latex having a core/shell structure according to DE-A 3 200 070, solids content 38.2% by weight and mean particle diameter ($d_{50}$) 480 nm, are initially introduced into a reactor, followed by purging with nitrogen for 15 minutes. After heating to 70° C., a solution of 3 g potassium peroxodisulfate in 100 g water is added in a gentle stream of nitrogen. The following solutions are then uniformly fed into the reactor over a period of 5 hours at 70° C.:

Solution 1: 399 g styrene, 155 g acrylonitrile, 36.5 g Ia.

Solution 2: 10 g of the sodium salt of $C_{14}-C_{18}$ alkyl sulfonic acids, 750 g water, 9 g 1N sodium hydroxide.

The mixture is left to polymerize for 6 hours at 70° C., after which 1% by weight (based on solids) of a phenolic stabilizer is added and the latex is coagulated with an aqueous magnesium sulfate solution. The polymer is washed with water and dried at 60° C.

A-III:

The procedure is as in Example A-II using the following solution as solution 1:

Solution 1: 412 g styrene, 160 g acrylonitrile, 18.2 g Ia.

1.2 Comparison graft copolymers

C-I:

The procedure is as in Example A-I using the following solution as solution 1:

Solution 1: 1232 g styrene, 634 g acrylonitrile.

C-II:

The procedure is as in Example A-II using the following solution as solution 1:

Solution 1: 425 g styrene, 165 g acrylonitrile.

1.3 Other Components 1.3.1 Polyvinyl chloride, K value 70.

1.3.2 Copolymer prepared by aqueous emulsion copolymerization of a monomer mixture of α-methyl styrene/acrylonitrile (72:28) having an intrinsic viscosity [η] of 1.3 (as measured in dimethyl formamide at 25° C.).

2. Production and testing of the molding compounds

To prepare the molding compounds, the components shown in Table 1 are homogeneously mixed in the quantities shown on mixing rolls at 180° C. with addition of 1% by weight octyl tin mercaptide and 0.2% by weight ester wax and the resulting mixtures are subsequently rolled to form approximately 1 mm thick sheets. The molding compounds are tested by storage in a Mathis oven at 190° C. and 200° C. and subsequent visual evaluation. The test times and results are shown in Table 2.

The results in Table 2 show that the molding compounds according to the invention show only slight discoloration after thermal ageing under the specified conditions whereas the comparison molding compounds are heavily discolored, indicating partial destruction thereof. In addition, the results in Table 2 show that the molding compounds according to the invention can be subjected to thermal ageing for much longer before they discolor to the same extent as the comparison molding compounds. These results reflect the superior ageing stability of the molding compounds according to the invention.

TABLE 1

Composition of molding compounds according to the invention and comparison molding compounds (C) (in % by weight)

| Example No. | A-I | A-II | A-III | C-I | C-II | 1.3.1 (PVC) | 1.3.2 (AMS resin) |
|---|---|---|---|---|---|---|---|
| 1 | 50 | — | — | — | — | 50 | — |
| 1-C | — | — | — | 50 | — | 50 | — |
| 2 | — | 50 | — | — | — | 50 | — |
| 2-C | — | — | — | — | 50 | 50 | — |
| 3 | — | — | 20 | — | — | 50 | 30 |
| 3-C | — | — | — | — | 20 | 50 | 30 |

TABLE 2

Testing of molding compounds according to the invention and comparison molding compounds (C) by storage in a Mathis oven (for composition, see TABLE 1)

| Example No. | Storage time/ temperature [mins./°C.] | Visual evaluation | Storage time for same discoloration as comparison samples [mins.] |
|---|---|---|---|
| 1 | 75/190 | yellow | >105 |
| 1-C | 75/190 | brown | |
| 2 | 45/190 | yellowish | 75 |
| 2-C | 45/190 | brown | |
| 3 | 20/200 | yellow | 30 |
| 3-C | 20/200 | dark brown | |

Examples for molding compositions containing glass fibres

1. Polymers

A) Graft polymers

Graft polymer of 50% by weight polybutadiene having an average particle diameter ($d_{50}$) of 380 nm as a grafting base and 50% by weight of a graft polymerized mixture of styrene and acrylonitrile (weight ratio 72/28) as a graft superstrate, the product was made by emulsion polymerization.

B) Copolymers

Molecular weight of the polymers is characterized by its L-value:

L-value = $(\eta_{rel} - 1)/0.005$;

wherein $\eta_{rel}$ is the relative solution viscosity determined in dimethyl formamide at 25° C. and a concentration of 0.005 g/cm$^3$.

B1:

Copolymer of styrene and acrylonitrile in a weight ratio of 72:28, manufactured by aqueous emulsion polymerization. The polymer has an L-value of 81.

B2:

Oxetanyl groups containing terpolymer made by aqueous emulsion polymerization of a mixture of styrene acrylonitrile and a compound of formula Ia

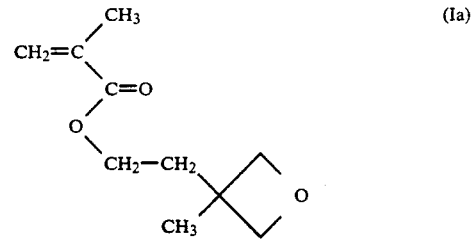

At a weight ratio of 67:28:5 using the sodium salt of disproportionated abietic acid as an emulsifier at a pH of 10. The polymer was recovered by coagulation of the polymer latex with an aqueous solution of magnesium sulfate sodium acetate and acidic acid (pH 4.2) in a conventional way. The polymer has an L-value of 94.

B3:

Oxetanyl groups containing terpolymer made by aqueous emulsion polymerization of a monomer mixture of styrene, acrylonitrile and the compound of formula Ia in a weight ratio of 62:28:10 using the sodium salt of disproportionated abietic acid as an emulsifier at pH 10. The polymer was recovered by coagulation with an aqueous solution of magnesium sulfate sodium acetate and acidic acid (pH 4.2) in a conventional way. The polymer has an L-value of 97.

Glass fibres
Glass fibres GF CS 7911 of Bayer, A. G.

2. Fabrication and evaluation of the molding composition

By mixing the components as identified in Table 1 in a 1.3 l internal kneader at about 200° C. thermoplastic molding compositions were made. After injection molding to form test specimens impact resistance and notched impact resistance were determined at room temperature and at −40° C. according ISO 179 (unit: kJ/m$^2$). All molding compositions contained as an additive 0.1 parts by weight of a silicon oil and 2 parts by weight of pentaerythritol tetrastearate in addition to the identified components. Surface properties were evaluated using plain sheets of 60×40×2 mm.

Table 1 shows that oxetanyl group containing polymers yield molding compositions with improved impact strength and notched impact strength.

TABLE 1

Composition and Properties of the Molding Compositions

| Example | A parts by weight | B1 parts by weight | B2 parts by weight | B3 parts by weight | C parts by weight | notched impact strength [kJ/m$^2$] RT | notched impact strength [kJ/m$^2$] −40° C. | improved impact strength [kJ/m$^2$] −40° C. | surface quality |
|---|---|---|---|---|---|---|---|---|---|
| 1 | 40 | 60 | — | — | 20 | 8.5 | 7.2 | 16.2 | very rough |
| 2 | 40 | — | 60 | — | 20 | 10.1 | 8.4 | 19.5 | rough |
| 3 | 40 | — | — | 60 | 20 | 10.3 | 8.2 | 21.8 | nearly smooth |

We claim:

1. A thermoplastic molding composition comprising a graft polymer, the graft polymer comprising:
   A.1 a graft shell copolymer of A.1.1 and A.1.2 wherein:
   A.1.1 is styrene, α-methyl styrene, acrylonitrile, C$_1$-C$_4$ vinyl carboxylic acid, C$_1$-C$_8$ alkyl acrylate, alkyl methacrylate, maleic acid derivatives, vinyl(idene) chloride or mixtures thereof, and
   A.1.2 is selected from monomers corresponding to formula I

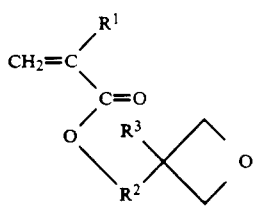

in which
   R$^1$ = H, CH$_3$,
   R$^2$ = C$_1$-C$_8$ alkylene,
   R$^3$ = C$_1$-C$_4$ alkyl; and
   A.2 a graft base of particulate diene or acrylate rubber having particle diameters (d$_{50}$) of from 80 to 800 nm.

2. A molding composition as claimed in claim 1 additionally comprising other thermoplastic polymers or graft polymers.

3. The molding composition as claimed in claim 1 wherein component A.1.1 is a mixture of styrene and acrylonitrile, component A.2 is particulate polybutadiene rubber, and component A.1.2. is a compound of the formula:

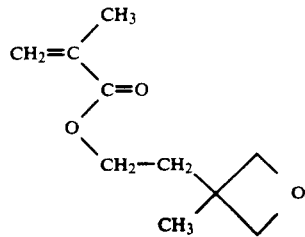

4. Molding compositions according to claim 1, containing glass fibres of
   A) 2 to 70 parts by weight of a graft polymer of
   A1) 10 to 95 weight-% of a monomer mixture consisting of
   A1.1) 99 to 50 weight-% styrene, α-methyl styrene, acrylonitrile, C$_1$-C$_4$-vinyl carboxylic acid, C$_1$-C$_8$-alkyl acrylates, C$_1$-C$_8$ alkyl methacrylates, maleic acid derivatives, vinyl chloride, vinylidine chloride or mixtures thereof and
   A1.2) 45 to 1 weight-% of a monomer of formula I grafted onto
   A2) 5 to 90 weight-% of a particulate diene and/or acrylate rubber having an average particle diameter d$_{50}$ of 80 to 800 nm and a gel content of more than 35% and
   B) 30 to 98 parts by weight of a thermoplastic copolymer of
   B1) styrene, α-methylstyrene, acrylonitrile, methacrylonitrile, carboxylic acid, C$_1$-C$_4$-vinyl esters, acrylic acid esters, methacrylic acid esters, maleic acid derivatives, vinyl chloride, vinylidene chloride and optionally
   B2) a monomer corresponding to formula I C) 10 to 100 parts by weight (per 100 parts by weight of A+B) glass fibres.

5. A molding composition as claimed in claim 4, wherein component A.1.1. is a mixture of styrene and acrylonitrile, component A.2. is particulate polybutadiene rubber, component A.1.2 is a compound of the formula

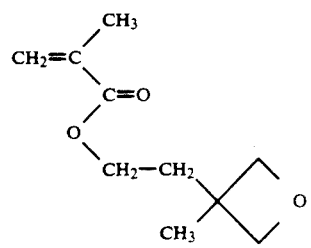

and component B.1. is a copolymer of styrene and acrylonitrile.